(12) United States Patent
De La Cropte De Chanterac et al.

(10) Patent No.: US 10,817,307 B1
(45) Date of Patent: Oct. 27, 2020

(54) API BEHAVIOR MODIFICATION BASED ON POWER SOURCE HEALTH

(71) Applicant: Apple Inc., Cupertino, CA (US)

(72) Inventors: Cyril De La Cropte De Chanterac, San Francisco, CA (US); Karen Eckert, San Jose, CA (US); John Ananny, San Mateo, CA (US); Anand Ramadurai, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 15/849,546

(22) Filed: Dec. 20, 2017

(51) Int. Cl.
*G06F 1/32* (2019.01)
*G06F 9/445* (2018.01)
*G06F 9/54* (2006.01)
*G06F 1/3212* (2019.01)

(52) U.S. Cl.
CPC ........ *G06F 9/44505* (2013.01); *G06F 1/3212* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 5,931,908 A | 8/1999 | Gerba et al. | |
| 5,944,829 A * | 8/1999 | Shimoda | G06F 1/3203 713/310 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,498,460 B1 | 12/2002 | Atkinson | |

(Continued)

FOREIGN PATENT DOCUMENTS

| | | |
|---|---|---|
| CN | 103677520 A | 3/2014 |
| EP | 2430833 A2 | 3/2012 |

(Continued)

OTHER PUBLICATIONS

Danish Search Report dated Apr. 20, 2017, for Application No. PA 2017 70089, eight pages.

(Continued)

*Primary Examiner* — Danny Chan
(74) *Attorney, Agent, or Firm* — Kubota & Basol LLP

(57) ABSTRACT

An electronic device is disclosed. The electronic device can include a processor to execute instructions; and a memory coupled to the processor and configured to store instructions, which when executed by the processor, cause the processor to perform a method. The method can include determining that one or more parameters of a battery of the electronic device, indicative of a health status of the battery, satisfy one or more conditions. In response to determining that the one or more parameters of the battery satisfy the one or more conditions, one or more characteristics of interactions, via one or more Application Programming Interfaces (APIs), between an application running on the electronic device and an operating system of the electronic device can be adjusted.

21 Claims, 7 Drawing Sheets

(56) References Cited

U.S. PATENT DOCUMENTS

| | | | |
|---|---|---|---|
| 6,690,387 B2 | 2/2004 | Zimmerman et al. | |
| 6,809,724 B1 | 10/2004 | Shiraishi et al. | |
| 7,015,894 B2 | 3/2006 | Morohoshi | |
| 7,184,064 B2 | 2/2007 | Zimmerman et al. | |
| 7,494,067 B1* | 2/2009 | Zhu | G06Q 20/20 235/435 |
| 7,663,607 B2 | 2/2010 | Hotelling et al. | |
| 8,121,656 B2 | 2/2012 | Imai | |
| 8,214,429 B2 | 7/2012 | Chidel et al. | |
| 8,271,057 B2 | 9/2012 | Levine et al. | |
| 8,335,549 B2 | 12/2012 | Lee | |
| 8,395,518 B2 | 3/2013 | Toba | |
| 8,479,122 B2 | 7/2013 | Hotelling et al. | |
| 8,526,782 B2 | 9/2013 | Kaiser et al. | |
| 8,639,291 B1 | 1/2014 | Gailloux et al. | |
| 8,686,682 B2 | 4/2014 | Eager et al. | |
| 8,775,501 B2 | 7/2014 | Chidel et al. | |
| 8,935,666 B2 | 1/2015 | Miller, III | |
| 8,978,075 B1 | 3/2015 | Kaiser et al. | |
| 9,031,382 B1 | 5/2015 | Kaiser et al. | |
| 9,055,393 B2 | 6/2015 | Arora et al. | |
| 9,516,127 B2* | 12/2016 | Nirantar | G06F 11/3013 |
| 9,620,001 B2 | 4/2017 | Brunolli | |
| 9,678,571 B1* | 6/2017 | Robert | G06F 1/325 |
| 9,892,691 B1 | 2/2018 | Lim et al. | |
| 10,228,751 B2 | 3/2019 | Andrews | |
| 2002/0042920 A1 | 4/2002 | Thomas et al. | |
| 2002/0181333 A1 | 12/2002 | Ito et al. | |
| 2003/0033449 A1 | 2/2003 | Frantz et al. | |
| 2003/0110171 A1 | 6/2003 | Ozer et al. | |
| 2004/0070371 A1 | 4/2004 | Chern et al. | |
| 2004/0070511 A1 | 4/2004 | Kim | |
| 2004/0177242 A1 | 9/2004 | Erickson | |
| 2004/0267940 A1 | 12/2004 | Dideriksen et al. | |
| 2005/0138137 A1 | 6/2005 | Encarnacion et al. | |
| 2005/0273515 A1 | 12/2005 | Bodlaender | |
| 2006/0197753 A1 | 9/2006 | Hotelling | |
| 2007/0022463 A1 | 1/2007 | Kelly | |
| 2007/0192818 A1 | 8/2007 | Bourges-Sevenier et al. | |
| 2007/0239920 A1 | 10/2007 | Frid | |
| 2007/0239921 A1 | 10/2007 | Toorians et al. | |
| 2007/0263860 A1 | 11/2007 | Buchen et al. | |
| 2008/0015932 A1 | 1/2008 | Haeuser et al. | |
| 2008/0034392 A1 | 2/2008 | Mccarthy et al. | |
| 2008/0079589 A1 | 4/2008 | Blackadar | |
| 2009/0055742 A1 | 2/2009 | Nordhagen | |
| 2009/0259957 A1 | 10/2009 | Slocum et al. | |
| 2009/0317061 A1 | 12/2009 | Jung et al. | |
| 2010/0014825 A1 | 1/2010 | Curtis et al. | |
| 2010/0046752 A1 | 2/2010 | Fahrny et al. | |
| 2010/0081485 A1 | 4/2010 | Velhal et al. | |
| 2010/0259559 A1 | 10/2010 | Schneider | |
| 2010/0293190 A1 | 11/2010 | Kaiser et al. | |
| 2010/0313042 A1 | 12/2010 | Shuster | |
| 2011/0059769 A1 | 3/2011 | Brunolli | |
| 2011/0154007 A1 | 6/2011 | Juvonen | |
| 2011/0231519 A1 | 9/2011 | Luby et al. | |
| 2011/0246801 A1 | 10/2011 | Seethaler et al. | |
| 2011/0252118 A1 | 10/2011 | Pantos et al. | |
| 2011/0260691 A1 | 10/2011 | Ishibashi et al. | |
| 2011/0316769 A1 | 12/2011 | Boettcher et al. | |
| 2012/0017004 A1 | 1/2012 | Furbeck | |
| 2012/0047380 A1 | 2/2012 | Nurmi | |
| 2012/0066673 A1 | 3/2012 | Miller, III | |
| 2012/0072919 A1* | 3/2012 | Salsbery | G06F 1/3203 718/105 |
| 2012/0096373 A1 | 4/2012 | Aguera Y Arcas et al. | |
| 2012/0185684 A1 | 7/2012 | Lee et al. | |
| 2012/0239949 A1* | 9/2012 | Kalyanasundaram | G06F 1/3212 713/320 |
| 2012/0254365 A1 | 10/2012 | Adimatyam et al. | |
| 2012/0254454 A1 | 10/2012 | Margush et al. | |
| 2012/0260118 A1* | 10/2012 | Jiang | G06F 9/4843 713/340 |
| 2013/0014155 A1 | 1/2013 | Clarke et al. | |
| 2013/0061249 A1* | 3/2013 | Schwartz, Jr. | G06F 9/44521 719/318 |
| 2013/0166655 A1 | 6/2013 | Martin | |
| 2013/0244633 A1 | 9/2013 | Jacobs et al. | |
| 2013/0254664 A1 | 9/2013 | Almstrand et al. | |
| 2013/0303154 A1* | 11/2013 | Gupta | G06F 21/56 455/423 |
| 2014/0007057 A1 | 1/2014 | Gill et al. | |
| 2014/0015682 A1 | 1/2014 | Ratzlaff et al. | |
| 2014/0020085 A1* | 1/2014 | Srour | G06F 21/53 726/17 |
| 2014/0068310 A1 | 3/2014 | Sultenfuss | |
| 2014/0075220 A1 | 3/2014 | Song | |
| 2014/0089948 A1* | 3/2014 | Li | G06F 9/445 719/328 |
| 2014/0122738 A1 | 5/2014 | Thang et al. | |
| 2014/0181858 A1 | 6/2014 | Kitazato | |
| 2014/0195653 A1 | 7/2014 | Alexander et al. | |
| 2014/0239733 A1 | 8/2014 | Mach et al. | |
| 2014/0344804 A1 | 11/2014 | Ein-Gal et al. | |
| 2014/0380282 A1* | 12/2014 | Ravindranath Sivalingam | G06F 11/3476 717/128 |
| 2015/0000889 A1* | 1/2015 | Bellamkonda | G01K 7/42 165/287 |
| 2015/0007049 A1 | 1/2015 | Langlois | |
| 2015/0040160 A1 | 2/2015 | Melnychenko et al. | |
| 2015/0102992 A1 | 4/2015 | Klement et al. | |
| 2015/0148109 A1 | 5/2015 | Gupta et al. | |
| 2015/0185849 A1 | 7/2015 | Levesque et al. | |
| 2015/0264429 A1 | 9/2015 | Winograd et al. | |
| 2015/0289019 A1 | 10/2015 | Merzon et al. | |
| 2015/0372820 A1 | 12/2015 | Schneider et al. | |
| 2016/0041597 A1 | 2/2016 | Graham et al. | |
| 2016/0041606 A1 | 2/2016 | Andrews et al. | |
| 2016/0062540 A1 | 3/2016 | Yang et al. | |
| 2016/0066278 A1 | 3/2016 | Zhao et al. | |
| 2016/0127781 A1 | 5/2016 | Park | |
| 2016/0187432 A1 | 6/2016 | Masakawa | |
| 2016/0241617 A1 | 8/2016 | Jelley et al. | |
| 2016/0299551 A1 | 10/2016 | Wu et al. | |
| 2018/0181185 A1 | 6/2018 | Graham et al. | |
| 2019/0115629 A1 | 4/2019 | Chen | |
| 2019/0179404 A1 | 6/2019 | Andrews et al. | |
| 2019/0190277 A1 | 6/2019 | Jung et al. | |
| 2020/0133384 A1 | 4/2020 | Andrews et al. | |

FOREIGN PATENT DOCUMENTS

| | | |
|---|---|---|
| EP | 2 610 701 A1 | 7/2013 |
| EP | 2 610 701 A9 | 7/2013 |
| JP | 2000-163031 A | 6/2000 |
| JP | 2002-342033 A | 11/2002 |
| WO | 2010/132718 A2 | 11/2010 |

OTHER PUBLICATIONS

Final Office Action dated Mar. 23, 2017, for U.S. Appl. No. 14/817,572, filed Aug. 4, 2015, 13 pages.

Final Office Action dated Apr. 27, 2017, for U.S. Appl. No. 14/799,370, filed Jul. 14, 2015, 19 pages.

International Search Report dated Jan. 29, 2016, for PCT Patent Application No. PCT/US2015/043487, eight pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Aug. 12, 2016, for U.S. Appl. No. 14/799,370, filed Jul. 14, 2015, fourteen pages.

Non-Final Office Action dated Sep. 12, 2016, for U.S. Appl. No. 14/817,572, filed Aug. 4, 2015, eight pages.

Non-Final Office Action dated Dec. 1, 2017, for U.S. Appl. No. 14/799,370, filed Jul. 14, 2015, 23 pages.

Rubine, D.H. (Dec. 1991). "The Automatic Recognition of Gestures," CMU-CS-91-202, Submitted in Partial Fulfillment of the

(56) References Cited

OTHER PUBLICATIONS

Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Final Office Action dated Jul. 26, 2018, for U.S. Appl. No. 14/799,370, filed Jul. 14, 2015, six pages.
Notice of Allowance dated Oct. 25, 2018, for U.S. Appl. No. 14/799,370, filed Jul. 14, 2015, five pages.
Notice of Allowance dated Nov. 30, 2017, for U.S. Appl. No. 14/817,572, filed Aug. 4, 2015, 26 pages.
Kaiser, David H., et al., U.S. Appl. No. 61/924,200, filed on Jan. 6, 2014, copy not attached.
Non-Final Office Action received for U.S. Appl. No. 15/849,486, dated Apr. 23, 2019, 11 pages.
Non-Final Office Action received for U.S. Appl. No. 15/902,401, dated Jul. 19, 2019, 11 pages.
Notice of Allowance received for Taiwanese Patent Application No. 104107332, dated Jun. 21, 2019, 5 pages (2 pages of English Translation and 3 pages of Official Copy).
Notice of Allowance received for U.S. Appl. No. 16/275,031, dated Sep. 19, 2019, 7 pages.
Office Action received for Chinese Patent Application No. 201580047640.0, dated Aug. 5, 2019, 18 pages (7 pages of English Translation and 11 pages of Official Copy).
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 363 pages.
Non-Final Office Action received for U.S. Appl. No. 15/849,533, dated Dec. 17, 2019, 11 pages.
Notice of Allowance received for U.S. Appl. No. 15/849,486, dated Nov. 14, 2019, 15 pages.
Notice of Allowance received for U.S. Appl. No. 15/902,401, dated Dec. 4, 2019, 8 pages.
Supplemental Notice of Allowance received for U.S. Appl. No. 15/902,401, dated Feb. 3, 2020, 2 pages.
Supplemental Notice of Allowance received for U.S. Appl. No. 15/902,401, dated Feb. 13, 2020, 2 pages.

\* cited by examiner

API BEHAVIOR MODIFICATION BASED ON POWER SOURCE HEALTH

FIELD OF THE DISCLOSURE

This relates generally to power management of an electronic device.

BACKGROUND OF THE DISCLOSURE

An electronic device may require a power supply, such as a battery. Further, the electronic device may require that the power supply have a certain minimum voltage or be able to provide a minimum amount of power to the electronic device in order to function properly. Accordingly, an electronic device may monitor the voltage and/or power output of its power supply, and power down the electronic device if the voltage/power output falls below an acceptable level. The ability of the power supply to provide sufficient voltage/power can be based on factors such as temperature and the health of the battery. Sometimes, the temperature and the health of the battery can be such that the power supply is unable to provide sufficient voltage/power to the electronic device, and the electronic device, consequently, may shutdown. Such shutdowns can be undesirable, especially from the perspective of the user of the electronic device.

SUMMARY OF THE DISCLOSURE

In general, as the health of a battery decreases, the ability of the battery to provide a certain amount of current at a given voltage to the circuitry of the electronic device can also decrease. As such, it can be beneficial for an electronic device to reduce or otherwise adjust its power requirements from the battery based on the health of the battery so as to prevent or reduce the likelihood that the electronic device shuts down when the battery is in a challenged state, thereby allowing the electronic device to be used for a longer period of time.

In the examples described herein, the electronic device can adjust the power that it requires from the battery by modifying the power used by one or more applications running on the electronic device, for example, by reducing CPU load, disk activity, networking activity, and/or any other power-consuming activity performed by one or more applications on the electronic device. In some examples, the electronic device can achieve this power modification (e.g., reduction) by adjusting functions/features/other characteristics of APIs implemented on the electronic device based on the health of the battery of the electronic device. In some examples, the electronic device can achieve this power modification (e.g., reduction) by maintaining the functions/features/other characteristics of the APIs implemented on the electronic device, while adjusting the response(s) of the API-implementing component(s) on the electronic device to commands received via the APIs in order to modify the power used by one or more applications running on the electronic device. It is understood that while the examples of the disclosure will be described with reference to applications as API-calling components, the examples of the disclosure also extend to any other API-calling components on the electronic device, as previously described.

DETAILED DESCRIPTION

Figure 1A:
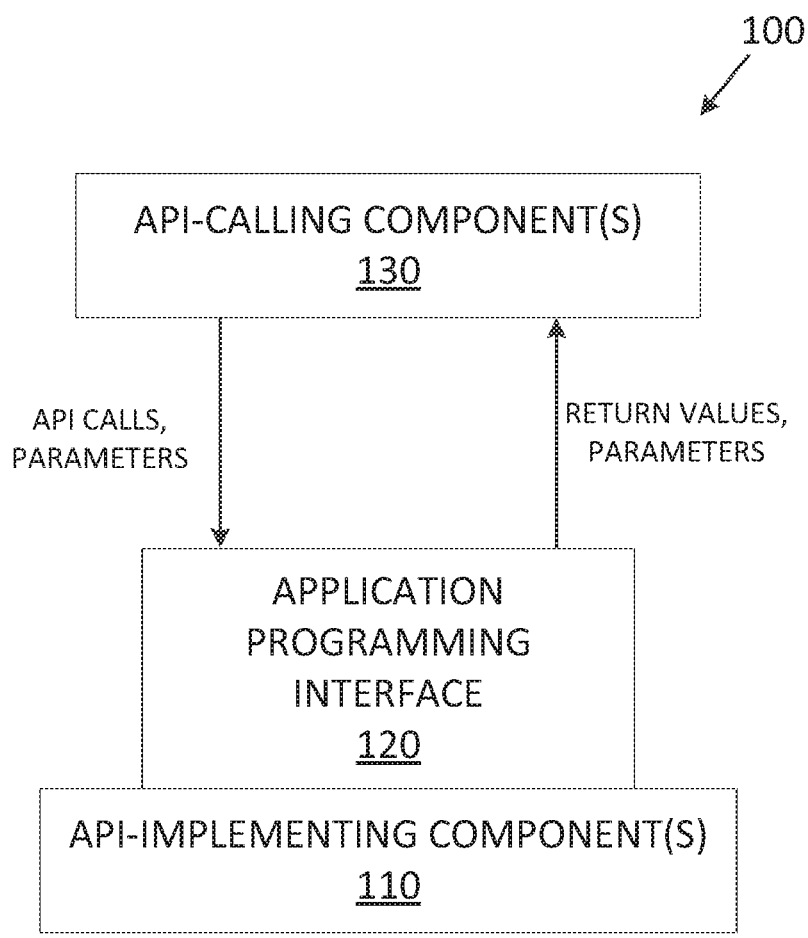
FIG. 1A is a block diagram illustrating an exemplary API architecture, which may be used in some examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

An electronic device may require a power supply, such as a battery. Further, the electronic device may require that the power supply have a certain minimum voltage or be able to provide a minimum amount of power to the electronic device in order to function properly. Accordingly, an electronic device may monitor the voltage and/or power output of its power supply, and power down the electronic device if the voltage/power output falls below an acceptable level. The ability of the power supply to provide sufficient voltage/power can be based on factors such as temperature and the health of the battery. Sometimes, the temperature and the health of the battery can be such that the power supply is unable to provide sufficient voltage/power to the electronic device, and the electronic device, consequently, may shutdown. Such shutdowns can be undesirable, especially from the perspective of the user of the electronic device. It should be noted that the examples of the disclosure will be described with reference to an electronic device having a battery as a power source, though it is understood that the disclosure may be extended to other types of power sources, such as AC power sources.

The examples of the disclosure are directed to Application Programming Interface (API) based power reduction schemes in which API-related behavior can be modified by the electronic device based on one or more parameters of the battery of the electronic device, which can be indicative of the health or general ability of the battery to provide power to the electronic device. In this way, the electronic device can prevent or reduce the likelihood of the electronic device shutting down when the battery is in a challenged state, thereby allowing the electronic device to be used for a longer period of time, as will be described below. As such, overall system power can be reduced by limiting the ability of APIs to allow subsystems of the electronic device to consume extra power in the background that is in addition to the power for tasks the user of the electronic device is performing in the foreground.

The examples disclosed herein can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The features described herein can be implemented as part of an application program interface (API) that can allow it to be incorporated into different applications. An API can allow a developer of an API-calling component (which may be a third party developer) to leverage specified features, such as those described herein, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions that are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

FIG. 1A is a block diagram illustrating an exemplary API architecture, which may be used in some examples of the disclosure. As shown in FIG. 1A, the API architecture 100 includes the API-implementing component 110 (e.g., an operating system, a library, a device driver, an API, an application program, software or other module) that implements the API 120. The API 120 specifies one or more functions, methods, classes, objects, protocols, data structures, formats and/or other features of the API-implementing component that may be used by the API-calling component 130. The API 120 can specify at least one calling convention that specifies how a function in the API-implementing component receives parameters from the API-calling component and how the function returns a result to the API-calling component. The API-calling component 120 (e.g., an operating system, a library, a device driver, an API, an application program, software or other module) makes API calls through the API 120 to access and use the features of the API-implementing component 110 that are specified by the API 120. The API-implementing component 110 may return a value through the API 120 to the API-calling component 130 in response to an API call.

It will be appreciated that the API-implementing component 110 may include additional functions, methods, classes, data structures, and/or other features that are not specified through the API 120 and are not available to the API-calling component 130. It should be understood that the API-calling component 130 may be on the same system as the API-implementing component 110 or may be located remotely and accesses the API-implementing component 110 using the API 120 over a network. While FIG. 1A illustrates a single API-calling component 130 interacting with the API 120, it should be understood that other API-calling components, which may be written in different languages (or the same language) than the API-calling component 130, may use the API 120.

The API-implementing component 110, the API 120, and the API-calling component 130 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 1B:
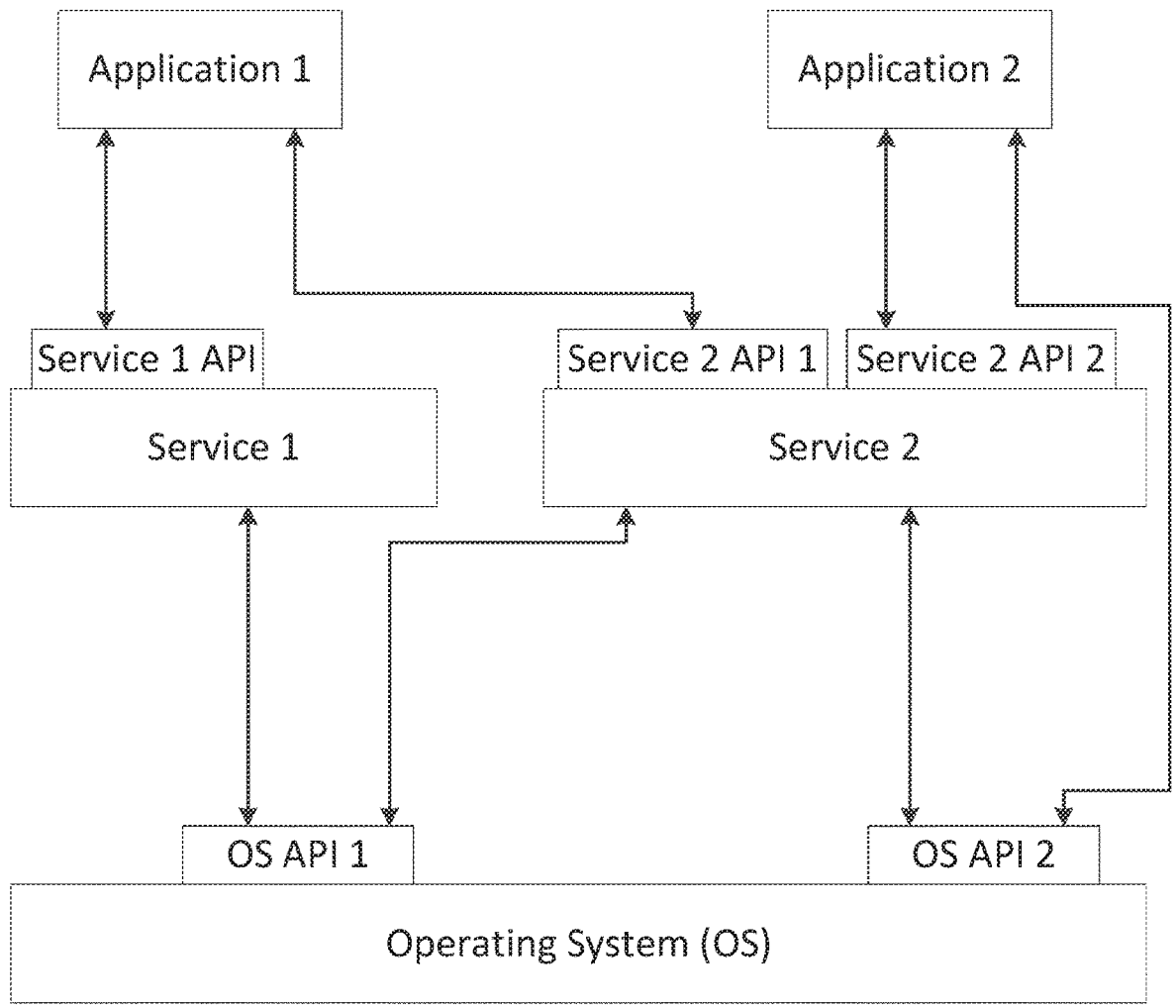
FIG. 1B illustrates an exemplary software stack of an API according to examples of the disclosure.

In the exemplary software stack shown in FIG. 1B, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

As mentioned above, the examples of the disclosure are directed to modifying the characteristics of APIs implemented on an electronic device based on characteristics of the power source (e.g., an AC power source, a DC battery, etc.), such as power source health-related characteristics. For example, the electronic device can implement various API-based power-reduction schemes based on power source health-related characteristics. For ease of description, the examples of the disclosure will be described with reference to an electronic device having a battery as a power source, though it is understood that the disclosure may be extended to other types of power sources, such as AC power sources.

Health-related characteristics of a battery can reflect the general health of the battery, which can generally reflect the ability of the battery to perform (e.g., provide power to the electronic device). In some examples, the health of the battery can be reflected in one or more of the following parameters of the battery: internal resistance/impedance/ conductance of the battery, capacity of the battery, voltage of the battery, self-discharge of the battery, ability of the battery to accept a charge, number of charge-discharge cycles, time since manufacture of the battery, time above a certain charge threshold, the use of the battery over time (e.g., how much the battery has been used to supply power, or how much power the battery has supplied), among others. In general, as the health of the battery decreases, the ability of the battery to provide a certain amount of current at a given voltage to the circuitry of the electronic device can also decrease. As such, it can be beneficial for the electronic device to reduce or otherwise adjust its power requirements from the battery based on the health of the battery so as to prevent or reduce the likelihood that the electronic device shuts down when the battery is in a challenged state, thereby allowing the electronic device to be used for a longer period of time.

In the examples described herein, the electronic device can adjust the power that it requires from the battery by modifying the power used by one or more applications running on the electronic device, for example, by reducing CPU load, disk activity, networking activity, and/or any other power-consuming activity performed by one or more applications on the electronic device. In some examples, the electronic device can achieve this power modification (e.g., reduction) by adjusting functions/features/other characteristics of APIs implemented on the electronic device based on the health of the battery of the electronic device. In some examples, the electronic device can achieve this power modification (e.g., reduction) by maintaining the functions/ features/other characteristics of the APIs implemented on the electronic device, while adjusting the response(s) of the API-implementing component(s) on the electronic device to commands received via the APIs in order to modify the power used by one or more applications running on the electronic device. It is understood that while the examples of the disclosure will be described with reference to applications as API-calling components, the examples of the disclosure also extend to any other API-calling components on the electronic device, as previously described.

The power reduction schemes of the disclosure can be implemented based on, possibly among other things, one or more battery health parameters. For example, the power reduction schemes can be implemented in response to the electronic device determining that the internal resistance/ impedance/conductance of the battery, the capacity of the battery, the voltage of the battery, the self-discharge of the battery, the ability of the battery to accept a charge, the number of charge-discharge cycles, the number of times the battery has been charged to full, the time since manufacture of the battery, the time above a certain charge threshold, the state of charge of the battery, the temperature of the battery/ electronic device, whether the electronic device is connected to a battery charger, etc., independently or in combination satisfy respective threshold values. As specific examples, the following conditions ("challenged system conditions") can cause the electronic device to trigger one or more of the power reduction schemes described in this disclosure:

The electronic device is not connected to a battery charger and the battery state of charge (SOC) is less than an SOC threshold and one or more of the following conditions are satisfied:
  battery impedance≤$R_1$ and battery/device temperature<$T_1$
  $R_1$≤battery impedance<$R_2$ and $T_1$≤battery/device temperature<$T_2$
  $R_2$≤battery impedance<$R_3$ and $T_2$≤battery/device temperature<$T_3$ battery impedance≥$R_3$ at any battery/device temperature where $R_1 < R_2 < R_3$ (e.g., impedance in Ohms) and $T_1 < T_2 < T_3$ (e.g., temperature in degrees Celcius). Satisfaction of one or more of the above-described conditions can indicate that the battery of the electronic device is in a "challenged" state in which the ability of the battery to provide power to the various components of the electronic device can be limited. In such circumstances, it can be beneficial for the electronic device to reduce the power drawn, from the battery, by the operations/components/circuitry of the electronic device in order to avoid or reduce the likelihood of an shutdown of the electronic device (e.g., due to the power requirements of the electronic device becoming higher than the power delivery ability of the battery). Accordingly, the electronic device can trigger one or more of the power-reduction schemes described below to reduce the power draw from the battery. It is understood that other combinations of the parameters described above can additionally or alternatively trigger the power reduction schemes of the disclosure.

Figure 2A:
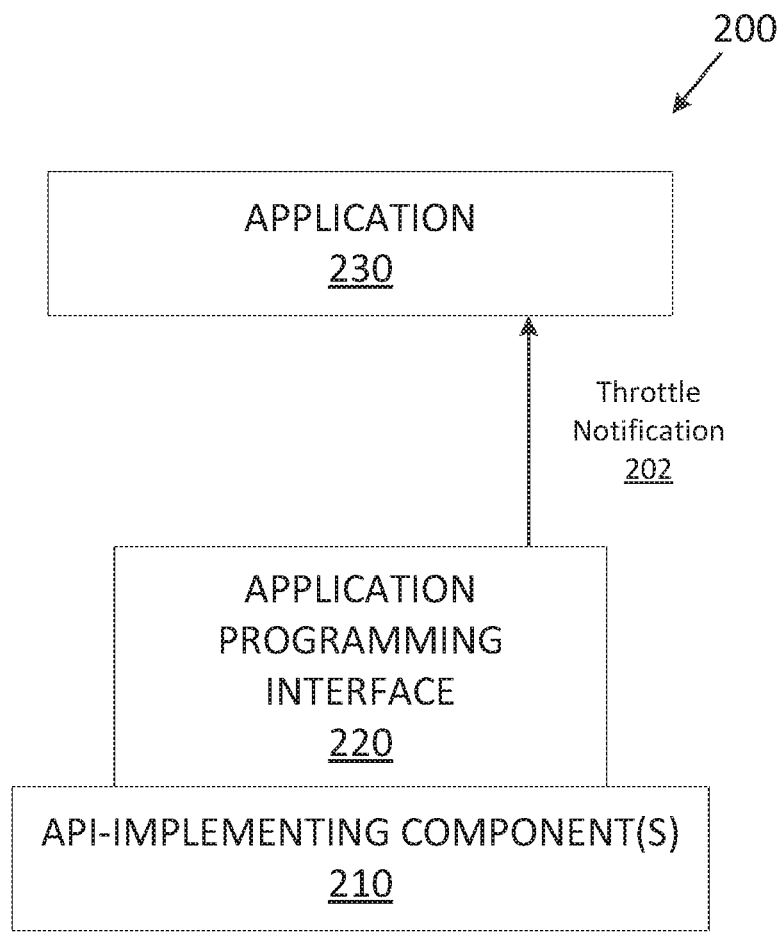
FIGS. 2A-2D illustrate exemplary API-based power reduction schemes according to examples of the disclosure.

FIG. 2A illustrates an example API architecture 200 of the disclosure in which throttle notifications 202 are generated by API-implementing component 210, via API 220, for delivery to application 230 based on one or more battery parameters according to examples of the disclosure. Specifically, API architecture 200 can correspond to API architecture 100 as described with reference to FIG. 1A. API-implementing component 210 can correspond to the operating system of the electronic device. In some examples, when the electronic device determines that one or more conditions are satisfied (e.g., the "challenged system conditions" are satisfied) that indicate that the battery of the electronic device is in a "challenged" state in which the ability of the battery to provide power to the various components of the electronic device can be limited, operating system 210 can issue a throttle notification 202, via API 220, to application 230, which can instruct application 230 to reduce its workload, and thus reduce the power draw of the operations performed by application 230. In some examples, operating system 210 can, in accordance with the conditions described here, reduce the power draw for application 230, and can inform application 230 of the reduced power draw (e.g., such that application 230 can adjust its operation/performance/features/experience/etc. to operate within the reduced power draw requirements).

For example, in response to receiving notification 202, application 230 can reduce the intensity and/or number of operations it performs by reducing the frame rate it requires from a graphics subsystem of the electronic device, reducing the processing it requires from a processing subsystem of the electronic device, reducing the volume output it requires from a speaker subsystem of the electronic device, etc. One or more of these changes to the operations performed by application 230 can reduce the power draw from the battery of the electronic device necessitated by application 230.

In some examples, throttle notification 202 can instruct different levels of workload reduction to application 230 depending on how challenged the battery of the system is determined to be. For example, if one or more of the battery health parameters previously-described indicate a high level of battery challenge (e.g., the battery is relatively old or has been relatively heavily used over time, the temperature is relatively cold, the battery impedance is relatively high, etc.), throttle notification 202 can instruct a relatively large workload reduction to application 230. If one or more of the battery health parameters previously-described indicate a moderate level of battery challenge (e.g., the battery is of moderate age or use over time, the temperature is moderate, the battery impedance is moderate, etc.), throttle notification 202 can instruct a moderate workload reduction to application 230. If one or more of the battery health parameters previously-described indicate a low level of battery challenge (e.g., the battery is relatively new or has been relatively lightly used over time, the temperature is relatively warm, the battery impedance is relatively low, etc.), throttle notification 202 can instruct a relatively low workload reduction to application 230. Additional or alternative throttling levels and/or triggers for throttling notifications 202 can similarly be implemented.

Figure 2B:
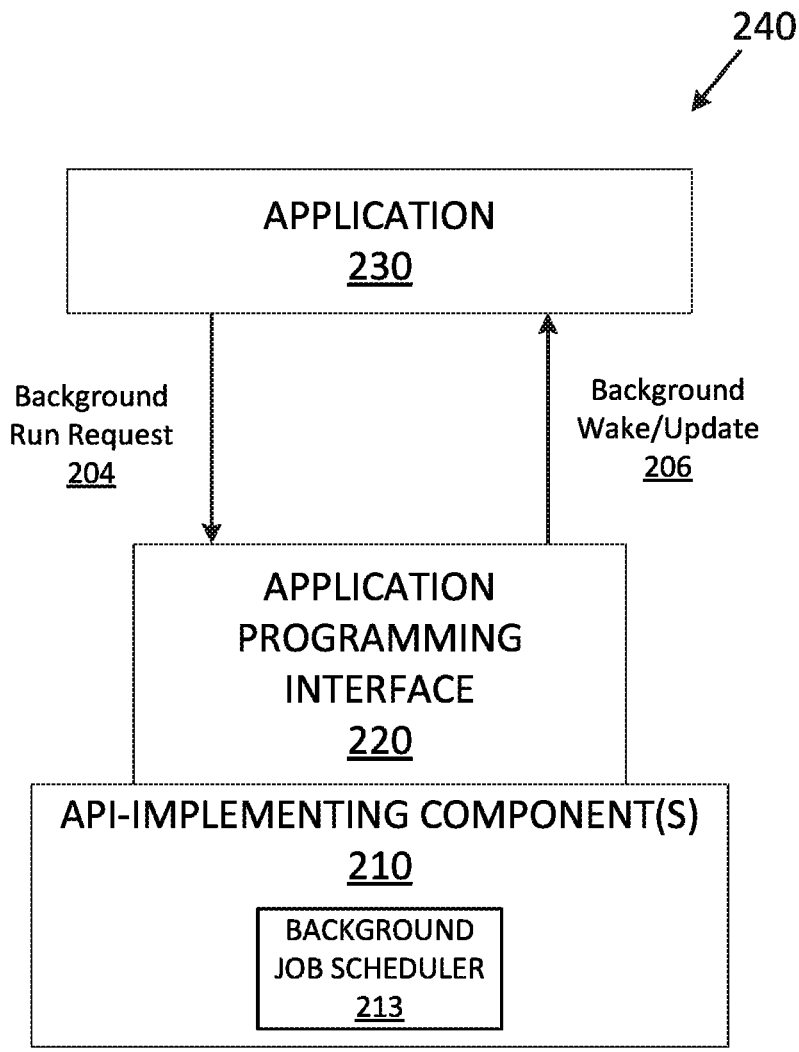

FIG. 2B illustrates an example API architecture 240 of the disclosure in which the rate of background application refreshing is based on one or more battery parameters according to examples of the disclosure. Specifically, API architecture 240 can correspond to API architecture 100 as described with reference to FIG. 1A. API-implementing component 210 can correspond to the operating system of the electronic device. In some examples, when the electronic device determines that one or more conditions are satisfied (e.g., the "challenged system conditions" are satisfied) that indicate that the battery of the electronic device is in a "challenged" state in which the ability of the battery to provide power to the various components of the electronic device can be limited, operating system 210 can reduce the rate at which, or otherwise change the scheduling at which, application 230 can update or refresh when application 230 is running in the background, and thus reduce the power draw of the operations performed by application 230 running in the background.

For example, application 230 can transmit a request to operating system 210, via API 220, to perform certain tasks (e.g., background CPU tasks, background discretionary network upload/download tasks, background update tasks, etc.) while application 230 is not running in the foreground on the electronic device (e.g., while application 230 is running in the background on the electronic device, and another application is running in the foreground on the electronic device). For example, an application running in the background can be an application that is running without user intervention and/or without a corresponding user interface displayed on the electronic device, and an application running in the foreground can be an application that is running with user intervention and/or with a corresponding user interface displayed on the electronic device. In FIG. 2B, this request can be represented by background run request 204.

Normally (e.g., when the "challenged system conditions" are not satisfied), as a result of having received request 204 from application 230, operating system 210 might issue background wake and/or update commands 206 to application 230, via API 220, at certain intervals while application 230 is running in the background, which can wake application 230 and allow it to perform its background tasks. However, in cases when one or more of the above-described conditions are satisfied (e.g., the "challenged system conditions" are satisfied), operating system 210 can reduce or otherwise modify the schedule at which it issues background wake and/or update commands 206 to application 230 while application 230 is running in the background. For example, operating system 210 can reschedule background wake and/or update commands 206 to application 230 to move them to times when the battery is otherwise less-utilized by other operations occurring on the electronic device (e.g., the power draw from the battery from other operations is less than a threshold amount, where the threshold amount can be based on one or more of the battery parameters described above). In some examples, operating system 210 can reduce the rate at which it issues background wake and/or update commands 206 to application 230. In some examples, operating system 210 can delay issuing background wake and/or update commands 206 to application 230. In some examples, operating system 210 can suspend issuing background wake and/or update commands 206 to application 230 until the "challenged system conditions" are not satisfied (e.g., battery health is improved, battery load is reduced, etc.). In some examples, when the "challenged system conditions" are not satisfied, operating system 210 may guarantee that application 230 is able to perform background tasks (e.g., operating system 210 may necessarily issue at least one background wake and/or update command 206 to application 230 while it is running in the background), while when the "challenged system conditions" are satisfied, operating system 210 may not guarantee that application 230 is able to perform background tasks (e.g., operating system 210 may not necessarily issue at least one background wake and/or update command 206 to application 230 while it is running in the background). In some examples, the above-described scheduling of background application waking/refreshing can be performed by background job scheduler 213 of operating system 210 (e.g., a component of operating system 210 that determines when and for how long a background process, such as the above-described background tasks/applications, is allowed to run. In some examples, operating system 210 can include a separate foreground job scheduler for determining when and for how long foreground processes are allowed to run). In these ways, operating system 210 can manage or otherwise reduce the power drawn by application 230 while application 230 is running in the background when the battery of the electronic device is in a "challenged" state in which the ability of the battery to provide power to the various components of the electronic device can be limited.

Figure 2C:
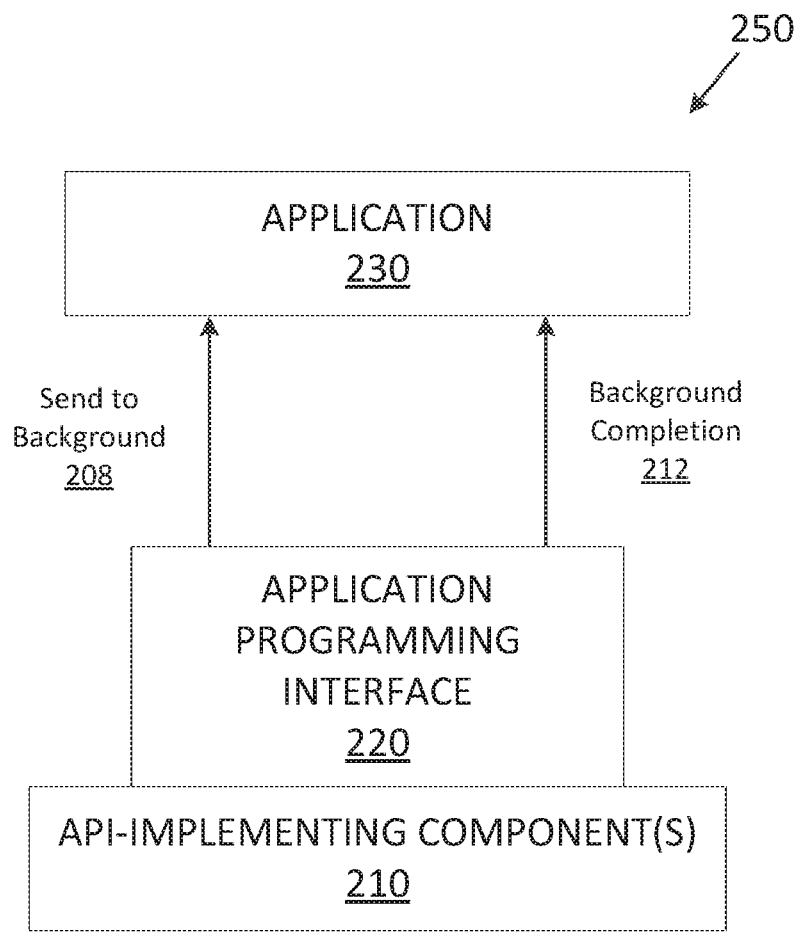

FIG. 2C illustrates an example API architecture 250 of the disclosure in which the amount of time that application 230 is given to complete one or more tasks in the background is based on one or more battery parameters according to examples of the disclosure. Specifically, API architecture 250 can correspond to API architecture 100 as described with reference to FIG. 1A. API-implementing component 210 can correspond to the operating system of the electronic device. In examples, when the electronic device determines that one or more conditions are satisfied (e.g., the "challenged system conditions" are satisfied) that indicate that the battery of the electronic device is in a "challenged" state in which the ability of the battery to provide power to the various components of the electronic device can be limited, operating system 210 can reduce the amount of time that application 230 is given to complete one or more tasks when application 230 is running in the background, and thus reduce the power draw of the operations performed by application 230 running in the background. While the examples here are provided in the context of controlling the time for application 230 to perform tasks while running in the background, the disclosure is not so limited, and can be extended to controlling the time for application 230 to perform tasks while running in the foreground.

For example, application 230 may be running in the foreground on the electronic device. At some point in time, application 230 can receive, from operating system 210 via API 220, a command 208 that indicates application 230 is to be sent to the background on the electronic device (e.g., in response to a user of the electronic device providing an input to the electronic device, such as selection of a button, that causes application 230 to be sent to the background). In some examples, the user of the electronic device can have sent application 230 to the background of the electronic device, and in some examples, application 230 can have, itself, initiated the transition from the foreground to the background. In some examples, after application 230 has been sent to the background, operating system 210 can allow application 230 to actively run in the background for a certain amount of time (e.g., 10, 20, 30 seconds) to complete any tasks that applications 230 needs to complete before operating system 210 suspends application 230 and before operating system 210 potentially ultimately kills/closes application 230 completely. Operating system 210 can indicate to application 230 that application 230 must complete its tasks, and that application 230 will be suspended, by transmitting to application 230, via API 220, a background completion command 212 (e.g., a callback function that application 230 must execute to indicate completion of its tasks, such as a piece of executable code that is passed as an argument to other code, which is expected to call back (execute) the argument at some convenient time) some period of time (e.g., 10, 20, 30 seconds) after application 230 has transitioned from foreground operation to background operation on the electronic device.

In some examples, the amount of time that operating system 210 allows application 230 to run in the background after application 230 transitions from the foreground to the background (e.g., the amount of time after the foreground-to-background transition at which operating system 210 transmits the background completion command 212 to application 230) can be based on one or more battery parameters, as described above. In some examples, this amount of time can be proportional (e.g., inversely proportional) to the current health of the battery of the electronic device, which can be reflected in one or more of the battery parameters described previously. For example, as the impedance of the battery increases, the amount of time that operating system 210 gives application 230 to complete its tasks after application 230 transitions from the foreground to the background can be reduced. Similarly, as the temperature of the battery/electronic device decreases, the amount of time that operating system 210 gives application 230 to complete its tasks after application 230 transitions from the foreground to the background can be reduced. Additional examples can include reducing the amount of time that operating system 210 gives application 230 to complete its tasks after application 230 transitions from the foreground to the background as the number of charge-discharge cycles of the battery increases, the time since battery manufacture increases, the self-discharge rate of the battery increases, etc. In some examples, the amount of time that operating system 210 gives application 230 to complete its tasks after application 230 transitions from the foreground to the background can be reduced when the battery of the electronic device is in a "challenged" state in which the ability of the battery to provide power to the various components of the electronic device can be limited, as previously described. In these ways, operating system 210 can manage or otherwise reduce the power drawn by application 230 while application 230 is running in the background.

Figure 2D:
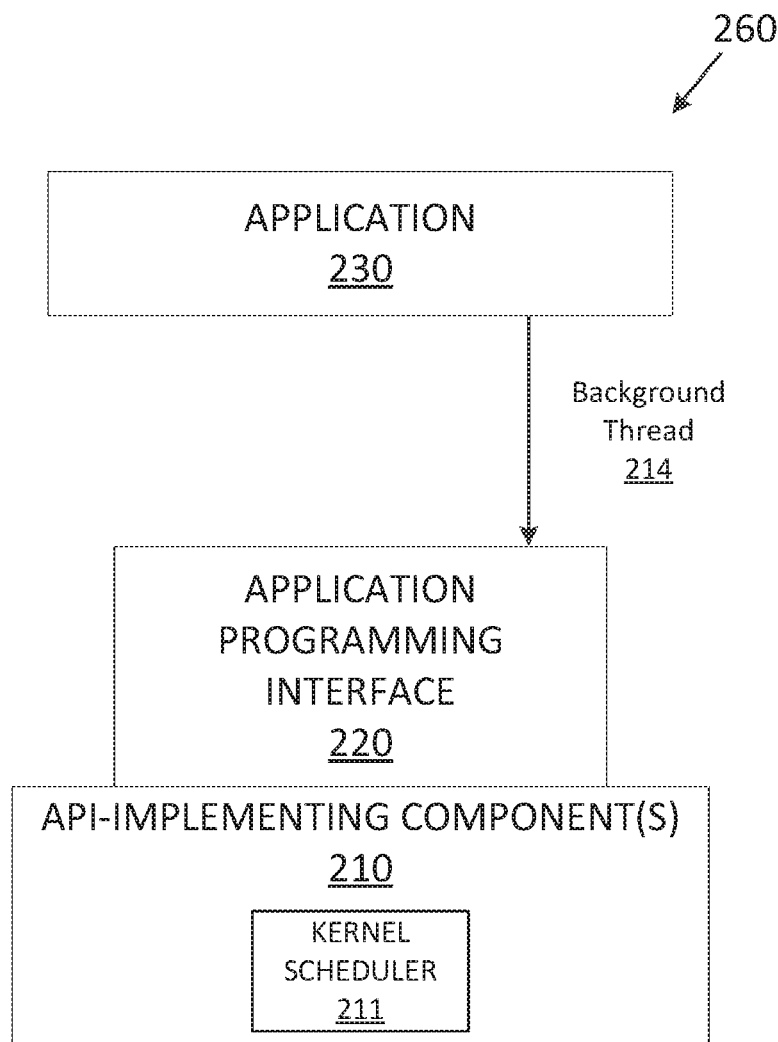

FIG. 2D illustrates an example API architecture 260 of the disclosure in which the scheduling of background threads of application 230 is based on one or more battery parameters according to examples of the disclosure. Specifically, API architecture 260 can correspond to API architecture 100 as described with reference to FIG. 1A. API-implementing component 210 can correspond to the operating system of the electronic device. In some examples, when the electronic device determines that one or more conditions are satisfied (e.g., the "challenged system conditions" are satisfied) that indicate that the battery of the electronic device is in a "challenged" state in which the ability of the battery to provide power to the various components of the electronic device can be limited, operating system 210 can throttle or reduce the scheduling of background threads of application 230, and thus reduce the power draw of the operations performed by application 230.

For example, when running, application 230 may utilize one or more of foreground threads and background threads to perform its operations (whether application 230 is running in the foreground or the background on the electronic device). For example, application 230 can utilize one or more background threads to perform operations that can be completed in the background that do not require corresponding updates to be made to a user interface displayed by application 230 on the electronic device. To utilize one or more such background threads, application 230 can issue background thread command 214 to operating system 210, via API 220, that indicates various parameters/features/etc. of the one or more background threads.

Normally (e.g., when the "challenged system conditions" are not satisfied), operating system 210 can schedule such background threads for execution according to a normal schedule or execution rate. However, in cases wherein one or more of the above-described conditions are satisfied (e.g., the "challenged system conditions" are satisfied), operating system 210 can reduce or otherwise modify the schedule or rate at which it executes the one or more background threads for application 230. For example, operating system 210 can execute the one or more background threads for application 230 less frequently, can delay executing the one or more background threads and schedule the one or more background threads for execution for times when power drawn by other applications/components on the electronic device has fallen below a threshold level, and/or can completely suspend/stop execution of the one or more background threads until battery health is improved, battery load is reduced, etc. (e.g., until the "challenged system conditions" are not satisfied). In some examples, the above-described scheduling of threads can be performed by kernel scheduler 211 of operating system 210 (e.g., a component of operating system 210 that determines when and for how long a process, such as the above-described background threads, is allowed to run). In these ways, operating system 210 can manage or otherwise reduce the power drawn by application 230 while application 230 is running when the battery of the electronic device is in a "challenged" state in which the ability of the battery to provide power to the various components of the electronic device can be limited.

Figure 3:
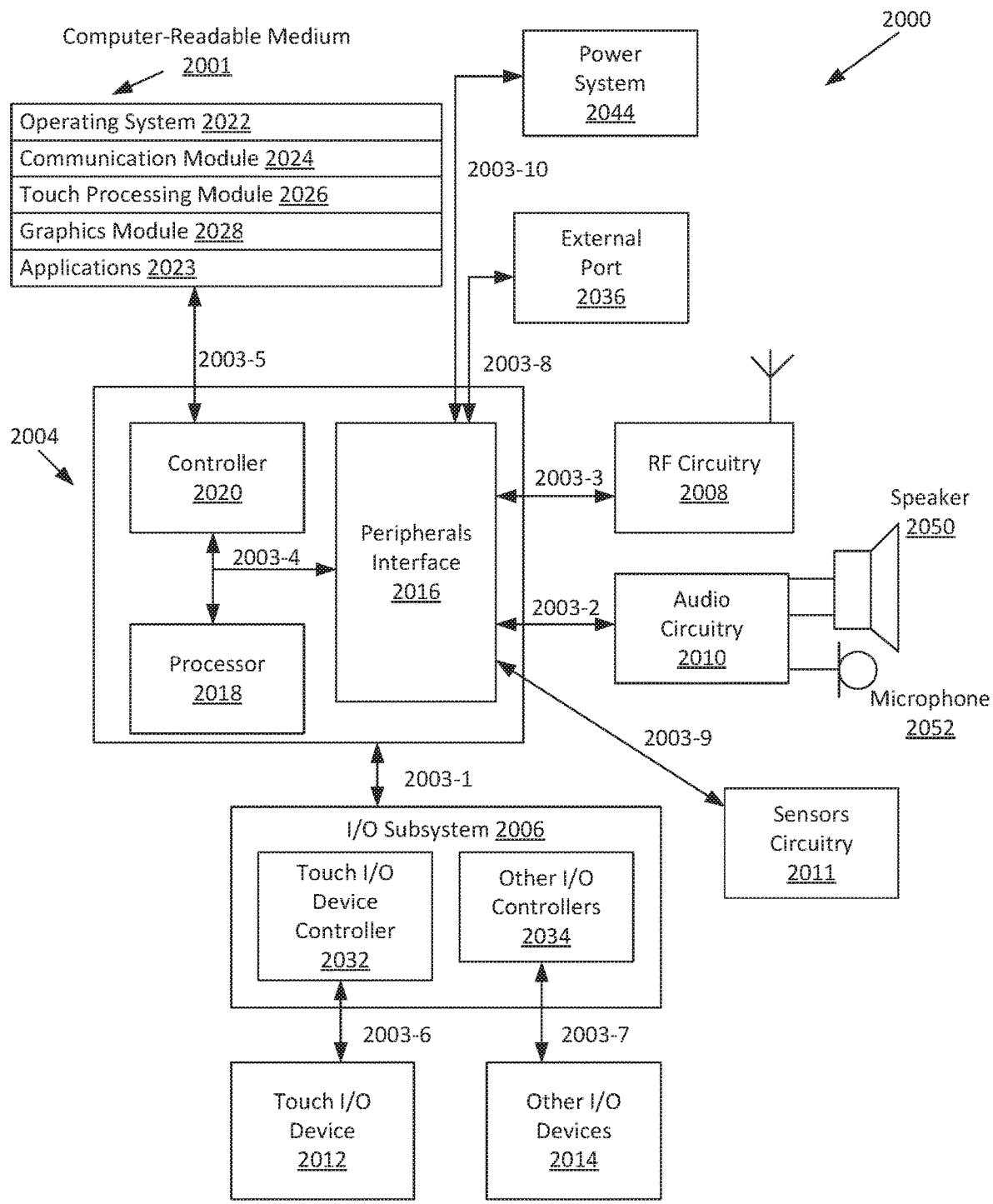
FIG. 3 is a block diagram illustrating an example of a system architecture that may be embodied within any portable or non-portable device according to examples of the disclosure.

Attention is now directed towards examples of a system architecture that may be embodied within any portable or non-portable electronic device according to the examples of the disclosure including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, a wearable device (e.g., a smart watch) or any other system or device adaptable to the inclusion of system architecture 2000, including combinations of two or more of these types of devices. FIG. 3 is a block diagram of one example of system 2000 that generally includes one or more computer-readable mediums 2001, processing system 2004, I/O subsystem 2006, radio frequency (RF) circuitry 2008, audio circuitry 2010, sensors circuitry 2011 and power system 2044. These components may be coupled by one or more communication buses or signal lines 2003.

It should be apparent that the architecture shown in FIG. 3 is only one example architecture of system 2000, and that system 2000 could have more or fewer components than shown, or a different configuration of components. The various components shown in FIG. 3 can be implemented in hardware, software, firmware or any combination thereof, including one or more signal processing and/or application specific integrated circuits. System 2000 can correspond to the electronic device in which the API-based power reduction schemes of the disclosure are implemented.

RF circuitry 2008 can be used to send and receive information over a wireless link or network to one or more other devices and includes well-known circuitry for performing this function. RF circuitry 2008 and audio circuitry 2010 can be coupled to processing system 2004 via peripherals interface 2016. Interface 2016 can include various known components for establishing and maintaining communication between peripherals and processing system 2004. Audio circuitry 2010 can be coupled to audio speaker 2050 and microphone 2052 and can include known circuitry for processing voice signals received from interface 2016 to enable a user to communicate in real-time with other users. In some examples, audio circuitry 2010 can include a headphone jack (not shown). Sensors circuitry 2011 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 can couple the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. In some examples, medium 2001 can be a non-transitory computer-readable storage medium. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can run various software components stored in medium 2001 to perform various functions for system 2000. In some examples, the software components can include operating system 2022, communication module (or set of instructions) 2024, touch processing module (or set of instructions) 2026, graphics module (or set of instructions) 2028, and one or more applications (or set of instructions) 2030. Each of these modules and above noted applications can correspond to a set of instructions for performing one or more of the API-based power reduction functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, medium 2001 may store a subset of the modules and data structures identified above. Furthermore, medium 2001 may store additional modules and data structures not described above.

Operating system 2022 can include various procedures, sets of instructions, software components and/or drivers for controlling and managing general system tasks (e.g., memory management, storage device control, power management, etc.) and facilitates communication between various hardware and software components.

Communication module 2024 can facilitate communication with other devices over one or more external ports 2036 or via RF circuitry 2008 and can include various software components for handling data received from RF circuitry 2008 and/or external port 2036.

Graphics module 2028 can include various known software components for rendering, animating and displaying graphical objects on a display surface. In examples in which touch I/O device 2012 is a touch sensing display (e.g., touch screen), graphics module 2028 can include components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 can include various software components for performing various tasks associated with touch I/O device 2012 including but not limited to receiving and processing touch input received from I/O device 2012 via touch I/O device controller 2032.

I/O subsystem 2006 can be coupled to touch I/O device 2012 and one or more other I/O devices 2014 for controlling or performing various functions. Touch I/O device 2012 can communicate with processing system 2004 via touch I/O device controller 2032, which can include various components for processing user touch input (e.g., scanning hardware). One or more other input controllers 2034 can receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 can display visual output to the user in a GUI. The visual output may include text, graphics, video, and any combination thereof. Some or all of the visual output may correspond to user-interface objects. Touch I/O device 2012 can form a touch sensing surface that accepts touch input from the user. Touch I/O device 2012 and touch screen controller 2032 (along with any associated modules and/or sets of instructions in medium 2001) can detect and track touches or near touches (and any movement or release of the touch) on touch I/O device 2012 and can convert the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples for which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 can also include power system 2044 for powering the various hardware components of system 2000 and may include a power management system, one or more power sources (e.g., a battery), a recharging system, a power failure detection circuit, a power converter or inverter, a power status indicator and any other components typically associated with the generation, management and distribution of power in portable devices. In some examples, the logic and/or circuitry for performing the API-based power reduction schemes of the disclosure can be included in power system 2044, which can be communicatively coupled via link 2003-10 to the remainder of system 2000.

In some examples, peripherals interface 2016, one or more processors 2018, and memory controller 2020 may be implemented on a single chip, such as processing system 2004. In some other examples, they may be implemented on separate chips.

Therefore, as described above, the API-based power reduction schemes of the disclosure can be advantageous in preventing or reducing the likelihood of an electronic device shutting down, or otherwise reducing the load on the battery of the electronic device, when the battery is in a challenged state, thereby allowing the electronic device to be used for a longer period of time.

Therefore, according to the above, some examples of the disclosure are directed to a method comprising: determining that one or more parameters of a battery of an electronic device, indicative of a health status of the battery, satisfy one or more conditions; and in response to determining that the one or more parameters of the battery satisfy the one or more conditions, adjusting one or more characteristics of interactions, via one or more Application Programming Interfaces (APIs), between an application running on the electronic device and an operating system of the electronic device.

Additionally or alternatively to one or more of the examples above, in some examples, adjusting the one or more characteristics of the interactions includes issuing a throttling command to the application based on the health status of the battery. Additionally or alternatively to one or more of the examples above, in some examples, adjusting the one or more characteristics of the interactions includes reducing a frequency at which the operating system wakes the application for background operation on the electronic device. Additionally or alternatively to one or more of the examples above, in some examples, adjusting the one or more characteristics of the interactions includes reducing an amount of time that the application is given to complete one or more tasks once the application has been moved from foreground operation to background operation on the electronic device. Additionally or alternatively to one or more of the examples above, in some examples, adjusting the one or more characteristics of the interactions includes reducing a rate at which one or more background threads of the application are executed on the electronic device.

Some examples of the disclosure are directed to a non-transitory computer readable storage medium having stored therein instructions, which when executed by an electronic device with memory and one or more processors, cause the electronic device to perform a method comprising: determining that one or more parameters of a battery of the electronic device, indicative of a health status of the battery, satisfy one or more conditions; and in response to determining that the one or more parameters of the battery satisfy the one or more conditions, adjusting one or more characteristics of interactions, via one or more Application Programming Interfaces (APIs), between an application running on the electronic device and an operating system of the electronic device. Additionally or alternatively to one or more of the examples above, in some examples, adjusting the one or more characteristics of the interactions includes issuing a throttling command to the application based on the health status of the battery. Additionally or alternatively to one or more of the examples above, in some examples, adjusting the one or more characteristics of the interactions includes reducing a frequency at which the operating system wakes the application for background operation on the electronic device. Additionally or alternatively to one or more of the examples above, in some examples, adjusting the one or more characteristics of the interactions includes reducing an amount of time that the application is given to complete one or more tasks once the application has been moved from foreground operation to background operation on the electronic device. Additionally or alternatively to one or more of the examples above, in some examples, adjusting the one or more characteristics of the interactions includes reducing a rate at which one or more background threads of the application are executed on the electronic device.

Some examples of the disclosure are directed to an electronic device, comprising: a processor to execute instructions; and a memory coupled to the processor and configured to store instructions, which when executed by the processor, cause the processor to perform a method comprising: determining that one or more parameters of a battery of the electronic device, indicative of a health status of the battery, satisfy one or more conditions; and in response to determining that the one or more parameters of the battery satisfy the one or more conditions, adjusting one or more characteristics of interactions, via one or more Application Programming Interfaces (APIs), between an application running on the electronic device and an operating system of the electronic device. Additionally or alternatively to one or more of the examples above, in some examples, adjusting the one or more characteristics of the interactions includes issuing a throttling command to the application based on the health status of the battery. Additionally or alternatively to one or more of the examples above, in some examples, adjusting the one or more characteristics of the interactions includes reducing a frequency at which the operating system wakes the application for background operation on the electronic device. Additionally or alternatively to one or more of the examples above, in some examples, adjusting the one or more characteristics of the interactions includes reducing an amount of time that the application is given to complete one or more tasks once the application has been moved from foreground operation to background operation on the electronic device. Additionally or alternatively to one or more of the examples above, in some examples, adjusting the one or more characteristics of the interactions includes reducing a rate at which one or more background threads of the application are executed on the electronic device.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method comprising:
at an operating system of an electronic device, wherein the operating system implements an Application Programming Interface (API):
determining that one or more parameters of a battery of an electronic device, indicative of a health status of the battery, satisfy one or more challenged system conditions; and
in response to determining that the one or more parameters of the battery satisfy the one or more challenged system conditions, providing, by the operating system, a first response of the API to a command issued to the API by an application running on the electronic device, wherein:
the command comprises a request to perform one or more tasks while the application is running in a background on the electronic device,
the first response comprises issuing, by the operating system via the API, wake or update commands to the application while the application is running in the background according to a first schedule,
in response to determining that the one or more parameters of the battery do not satisfy the one or more challenged system conditions, the operating system is configured to provide a second response, different from the first response, of the API to the command issued to the API by the application running on the electronic device, and
the second response comprises issuing, by the operating system via the API, wake or update commands to the application while it is running in the background according to a second schedule, different from the first schedule.

2. The method of claim 1, wherein, in the first response, the operating system issues the wake or update commands to the application at times selected based on battery utilization of other operations occurring on the electronic device.

3. The method of claim 1, wherein, in the first response, the operating system delays issuing the wake or update commands to the application until the one or more parameters of the battery do not satisfy the one or more challenged system conditions.

4. The method of claim 1, wherein:
in the second response, the operating system will necessarily issue at least one wake or update command to the application while it is running in the background, and
in the first response, the operating system will not necessarily issue at least one wake or update command to the application while it is running in the background.

5. The method of claim 1, further comprising:
in response to determining that the one or more parameters of the battery satisfy the one or more challenged system conditions, providing, by the operating system, a third response, different from the first response and the second response, of the API to a second command issued to the API by a second application running on the electronic device, wherein:
the second command issued by the second application to the API comprises a request for the operating system to schedule execution of one or more threads,
the third response comprises scheduling, by the operating system, execution of the one or more threads according to a third schedule,
in response to determining that the one or more parameters of the battery do not satisfy the one or more challenged system conditions, the operating system is configured to provide, a fourth response, different from the third response, of the API to the second command issued to the API by the second application running on the electronic device, and
the fourth response comprises scheduling, by the operating system, execution of the one or more threads according to a fourth schedule, different from the third schedule.

6. The method of claim 5, wherein, in the fourth response, the operating system schedules execution of the one or more threads for times selected based on battery utilization of other operations occurring on the electronic device.

7. The method of claim 5, wherein, in the fourth response, the operating system delays execution of the one or more threads until the one or more parameters of the battery do not satisfy the one or more challenged system conditions.

8. A non-transitory computer readable storage medium having stored therein instructions, which when executed by an electronic device with memory and one or more processors, cause the electronic device to perform a method comprising:
at an operating system of the electronic device, wherein the operating system implements an Application Programming Interface (API):
determining that one or more parameters of a battery of an electronic device, indicative of a health status of the battery, satisfy one or more challenged system conditions; and
in response to determining that the one or more parameters of the battery satisfy the one or more challenged system conditions, providing, by the operating system, a first response of the API to a command issued to the API by an application running on the electronic device, wherein:
the command corresponds comprises a request to perform one or more tasks while the application is running in a background on the electronic device,
the first response comprises issuing, by the operating system via the API, wake or update commands to the application while the application is running in the background according to a first schedule,
in response to determining that the one or more parameters of the battery do not satisfy the one or more challenged system conditions, the operating system is configured to provide a second response, different from the first response, of the API to the command issued to the API by the application running on the electronic device, and
the second response comprises issuing, by the operating system via the API, wake or update commands to the application while it is running in the background according to a second schedule, different from the first schedule.

9. The non-transitory computer readable storage medium of claim 8, wherein, in the first response, the operating system issues the wake or update commands to the application at times selected based on battery utilization of other operations occurring on the electronic device.

10. The non-transitory computer readable storage medium of claim 8, wherein, in the first response, the operating system delays issuing the wake or update commands to the application until the one or more parameters of the battery do not satisfy the one or more challenged system conditions.

11. The non-transitory computer readable storage medium of claim 8, wherein:
in the second response, the operating system will necessarily issue at least one wake or update command to the application while it is running in the background, and
in the first response, the operating system will not necessarily issue at least one wake or update command to the application while it is running in the background.

12. The non-transitory computer readable storage medium of claim 8, wherein the method further comprises:
in response to determining that the one or more parameters of the battery satisfy the one or more challenged system conditions, providing, by the operating system, a third response, different from the first response and the second response, of the API to a second command issued to the API by a second application running on the electronic device, wherein:
the second command issued by the second application to the API comprises a request for the operating system to schedule execution of one or more threads,
the third response comprises scheduling, by the operating system, execution of the one or more threads according to a third schedule,
in response to determining that the one or more parameters of the battery do not satisfy the one or more challenged system conditions, the operating system is configured to provide, a fourth response, different from the third response, of the API to the second command issued to the API by the second application running on the electronic device, and
the fourth response comprises scheduling, by the operating system, execution of the one or more threads according to a fourth schedule, different from the third schedule.

13. The non-transitory computer readable storage medium of claim 12, wherein, in the fourth response, the operating system schedules execution of the one or more threads for times selected based on battery utilization of other operations occurring on the electronic device.

14. The non-transitory computer readable storage medium of claim 12, wherein, in the fourth response, the operating system delays execution of the one or more threads until the one or more parameters of the battery do not satisfy the one or more challenged system conditions.

15. An electronic device, comprising:
   a processor to execute instructions; and
   a memory coupled to the processor and configured to store instructions, which when executed by the processor, cause the processor to perform a method comprising:
   at an operating system of the electronic device, wherein the operating system implements an Application Programming Interface (API):
   determining that one or more parameters of a battery of an electronic device, indicative of a health status of the battery, satisfy one or more challenged system conditions; and
   in response to determining that the one or more parameters of the battery satisfy the one or more conditions, providing, by the operating system, a first response of the API to a command issued to the API by an application running on the electronic device, wherein:
      the command comprises a request to perform one or more tasks while the application is running in a background on the electronic device,
      the first response comprises issuing, by the operating system via the API, wake or update commands to the application while the application is running in the background according to a first schedule,
      in response to determining that the one or more parameters of the battery do not satisfy the one or more challenged system conditions, the operating system is configured to provide a second response, different from the first response, of the API to the command issued to the API by the application running on the electronic device, and
      the second response comprises issuing, by the operating system via the API, wake or update commands to the application while it is running in the background according to a second schedule, different from the first schedule.

16. The electronic device of claim 15, wherein, in the first response, the operating system issues the wake or update commands to the application at times selected based on battery utilization of other operations occurring on the electronic device.

17. The electronic device of claim 15, wherein, in the first response, the operating system delays issuing the wake or update commands to the application until the one or more parameters of the battery do not satisfy the one or more challenged system conditions.

18. The electronic device of claim 15, wherein:
   in the second response, the operating system will necessarily issue at least one wake or update command to the application while it is running in the background, and
   in the first response, the operating system will not necessarily issue at least one wake or update command to the application while it is running in the background.

19. The electronic device of claim 15, wherein the method further comprises:
   in response to determining that the one or more parameters of the battery satisfy the one or more challenged system conditions, providing, by the operating system, a third response, different from the first response and the second response, of the API to a second command issued to the API by a second application running on the electronic device, wherein:
      the second command issued by the second application to the API comprises a request for the operating system to schedule execution of one or more threads,
      the third response comprises scheduling, by the operating system, execution of the one or more threads according to a third schedule,
      in response to determining that the one or more parameters of the battery do not satisfy the one or more challenged system conditions, the operating system is configured to provide, a fourth response, different from the third response, of the API to the second command issued to the API by the second application running on the electronic device, and
      the fourth response comprises scheduling, by the operating system, execution of the one or more threads according to a fourth schedule, different from the third schedule.

20. The electronic device of claim 19, wherein, in the fourth response, the operating system schedules execution of the one or more threads for times selected based on battery utilization of other operations occurring on the electronic device.

21. The electronic device of claim 19, wherein, in the fourth response, the operating system delays execution of the one or more threads until the one or more parameters of the battery do not satisfy the one or more challenged system conditions.

* * * * *

UNITED STATES PATENT AND TRADEMARK OFFICE
CERTIFICATE OF CORRECTION

PATENT NO. : 10,817,307 B1
APPLICATION NO. : 15/849546
DATED : October 27, 2020
INVENTOR(S) : Cyril De La Cropte De Chanterac et al.

Page 1 of 1

It is certified that error appears in the above-identified patent and that said Letters Patent is hereby corrected as shown below:

In the Claims

In Column 17, Line 63, in Claim 8, after "command" delete "corresponds".

Signed and Sealed this
Fifteenth Day of December, 2020

Andrei Iancu
*Director of the United States Patent and Trademark Office*